US008428946B1

(12) United States Patent
Paniconi

(10) Patent No.: US 8,428,946 B1
(45) **Date of Patent: *Apr. 23, 2013**

(54) SYSTEM AND METHOD FOR MULTI-CHANNEL MULTI-FEATURE SPEECH/NOISE CLASSIFICATION FOR NOISE SUPPRESSION

(75) Inventor: Marco Paniconi, Campbell, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,460

(22) Filed: Jul. 6, 2012

Related U.S. Application Data

(63) Continuation of application No. 13/193,297, filed on Jul. 28, 2011, now Pat. No. 8,239,196.

(51) Int. Cl.
*G10L 15/20* (2006.01)

(52) U.S. Cl.
USPC ............ 704/233; 704/202; 704/226; 704/232

(58) Field of Classification Search .................. 704/202, 704/226, 232, 233; 381/71.1, 94.1
See application file for complete search history.

(56) References Cited

U.S. PATENT DOCUMENTS 5,185,848 A * 2/1993 Aritsuka et al. .............. 704/202
5,251,263 A * 10/1993 Andrea et al. ............... 381/71.6
5,335,312 A * 8/1994 Mekata et al. ................ 704/202
5,353,376 A * 10/1994 Oh et al. ........................ 704/233
6,363,345 B1 * 3/2002 Marash et al. ................ 704/226
6,804,651 B2 * 10/2004 Juric et al. ..................... 704/265
6,820,053 B1 * 11/2004 Ruwisch ........................ 704/232
6,937,980 B2 * 8/2005 Krasny et al. ................. 704/231
7,031,478 B2 * 4/2006 Belt et al. ......................... 381/92
7,565,288 B2 * 7/2009 Acero et al. .................. 704/226
7,590,530 B2 * 9/2009 Zhao et al. ..................... 704/226
7,620,546 B2 * 11/2009 Hetherington et al. ....... 704/232

* cited by examiner

*Primary Examiner* — Talivaldis Ivars Smits
*Assistant Examiner* — Shaun Roberts
(74) *Attorney, Agent, or Firm* — Birch, Stewart, Kolasch & Birch, LLP

(57) ABSTRACT

An architecture and framework for speech/noise classification of an audio signal using multiple features with multiple input channels (e.g., microphones) are provided. The architecture may be implemented with noise suppression in a multi-channel environment where noise suppression is based on an estimation of the noise spectrum. The noise spectrum is estimated using a model that classifies each time/frame and frequency component of a signal as speech or noise by applying a speech/noise probability function. The speech/noise probability function estimates a speech/noise probability for each frequency and time bin. A speech/noise classification estimate is obtained by fusing (e.g., combining) data across different input channels using a layered network model. Individual feature data acquired at each channel and/or from a beam-formed signal is mapped to a speech probability, which is combined through layers of the model into a final speech/noise classification for use in noise estimation and filtering processes for noise suppression.

20 Claims, 5 Drawing Sheets

SYSTEM AND METHOD FOR MULTI-CHANNEL MULTI-FEATURE SPEECH/NOISE CLASSIFICATION FOR NOISE SUPPRESSION

This application is a Continuation of application Ser. No. 13/193,297 filed on Jul. 28, 2011 now U.S. Pat. No. 8,239,196, the entire contents of which is hereby incorporated by reference.

TECHNICAL FIELD

The present disclosure generally relates to systems and methods for transmission of audio signals such as voice communications. More specifically, aspects of the present disclosure relate to estimating and filtering noise using speech probability modeling.

BACKGROUND

In audio communications (e.g., voice communications), excessive amounts of surrounding and/or background noise can interfere with intended exchanges of information and data between participants. Surrounding and/or background noise includes noise introduced from a number of sources, some of the more common of which include computers, fans, microphones, and office equipment. Accordingly, noise suppression techniques are sometimes implemented to reduce or remove such noise from audio signals during communication sessions.

When multiple input channels (e.g., microphones) are involved in audio communications, noise suppression processing becomes more complex. Conventional approaches to multi-channel noise suppression focus on a beam-forming component (e.g., a combined signal), which is a time-delayed sum of the two (or more) input channel/microphone signals. These conventional approaches use this combined input signal as the basis for noise estimation and speech enhancement processes that form part of the overall noise suppression. A problem with these conventional approaches is that the beam-forming may not be effective. For example, if a user moves around, or the room filter (and hence time-delays) are difficult to estimate, then relying on the beam-formed signal only is not effective in reducing noise.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for noise estimation and filtering based on classifying an audio signal received at a noise suppression module via a plurality of input channels as speech or noise, the method comprising: measuring signal classification features for a frame of the audio signal input from each of the plurality of input channels; generating a feature-based speech probability for each of the measured signal classification features of each of the plurality of input channels; generating a combined speech probability for the measured signal classification features over the plurality of input channels; classifying the audio signal as speech or noise based on the combined speech probability; and updating an initial noise estimate for each of the plurality of input channels using the combined speech probability.

In another embodiment of the disclosure, the step of generating the combined speech probability in the method for noise estimation and filtering is performed using a probabilistic layered network model.

In another embodiment of the disclosure, the method for noise estimation and filtering further comprises determining a speech probability for an intermediate state of a layer of the probabilistic layered network model using data from a lower layer of the probabilistic layered network model.

In still another embodiment of the disclosure, the method for noise estimation and filtering further comprises applying an additive model or a multiplicative model to one of a set of state-conditioned transition probabilities to combine data from a lower layer of the probabilistic layered network model.

In another embodiment of the disclosure, the measured signal classification features from the plurality of input channels are input data to the probabilistic layered network model.

In another embodiment of the disclosure, the measured signal classification features from the plurality of input channels are input data to the probabilistic layered network model.

In yet another embodiment of the disclosure, the combined speech probability over the plurality of input channels is an output of the probabilistic layered network model.

In another embodiment of the disclosure, the probabilistic layered network model includes a set of intermediate states each denoting a class state of speech or noise for one or more layers of the probabilistic layered network model.

In another embodiment of the disclosure, the probabilistic layered network model further includes a set of state-conditioned transition probabilities.

In still a another embodiment of the disclosure, the feature-based speech probability for each of the measured signal classification features denotes a probability of a class state of speech or noise for a layer of the one or more layers of probabilistic layered network model In another embodiment of the disclosure, the speech probability for the intermediate state of the layer of the probabilistic layered network model is determined using one or both of an additive model and a multiplicative model.

In another embodiment of the disclosure, the method for noise estimation and filtering further comprises generating, for each of the plurality of input channels, a speech probability for the input channel using the feature-based speech probabilities of the input channel.

In another embodiment of the disclosure, the speech probability for the input channel denotes a probability of a class state of speech or noise for a layer of the one or more layers of the probabilistic layered network model.

In yet another embodiment of the disclosure, the combined speech probability is generated as a weighted sum of the speech probabilities for the plurality of input channels.

In another embodiment of the disclosure, the weighted sum of the speech probabilities includes one or more weighting terms, the one or more weighting terms being based on one or more conditions.

In one embodiment of the disclosure the probabilistic layered network model is a Bayesian network model, while in another embodiment of the disclosure the probabilistic layered network model includes three layers.

In yet another embodiment of the disclosure, the step of classifying the audio signal as speech or noise based on the combined speech probability includes applying a threshold to the combined speech probability.

In another embodiment of the disclosure, the method for noise estimation and filtering further comprises determining an initial noise estimate for each of the plurality of input channels.

In still another embodiment of the disclosure, the method for noise estimation and filtering further comprises: combining the frames of the audio signal input from the plurality of input channels; measuring at least one signal classification feature of the combined frames of the audio signal; calculating a feature-based speech probability for the combined frames using the measured at least one signal classification feature; and combining the feature-based speech probability for the combined frames with the speech probabilities generated for each of the plurality of input channels.

In one embodiment of the disclosure the combined frames of the audio signal is a time-aligned superposition of the frames of the audio signal received at each of the plurality of input channels, while in another embodiment of the disclosure the combined frames of the audio signal is a signal generated using beam-forming on signals from the plurality of input channels.

In another embodiment of the disclosure, the combined frames of the audio signal is used as an additional input channel to the plurality of input channels.

In one or more other embodiments of the disclosure, the feature-based speech probability is a function of the measured signal classification feature, and the speech probability for each of the plurality of input channels is a function of the feature-based speech probabilities for the input channel.

In another embodiment of the disclosure, the speech probability for each of the plurality of input channels is obtained by combining the feature-based speech probabilities of the input channel using one or both of an additive model and a multiplicative model for a state-conditioned transition probability.

In still another embodiment of the disclosure, the feature-based speech probability is generated for each of the signal classification features by mapping each of the signal classification features to a probability value using a map function.

In other embodiments of the disclosure, the method for noise estimation and filtering described herein may optionally include one or more of the following additional features: the map function is a model with a set of width and threshold parameters; the feature-based speech probability is updated with a time-recursive average; the signal classification features include at least: average likelihood ratio over time, spectral flatness measure, and spectral template difference measure; at any layer and for any intermediate state, an additive model is used to generate a speech probability for the intermediate state, conditioned on the lower layer state; at any layer and for any intermediate state, a multiplicative model is used to generate a speech probability for the intermediate state, conditioned on the lower layer state; for a single input channel an additive model is used for a middle layer of the probabilistic layered network model to generate a speech probability for the single input channel; for a single input channel a multiplicative model is used for a middle layer of the probabilistic layered network model to generate a speech probability for the single input channel; a speech probability for an intermediate state at any intermediate layer of the probabilistic layered network model conditioned on a state on the previous layer is fixed off-line or determined adaptively on-line; for a set of two input channels an additive model is used for a top layer of the probabilistic layered network model to generate a speech probability for the two input channels; a beam-formed signal is another input to the probabilistic layered network model and an additive model is used for a top layer to generate a speech probability for the two input channels and the beam-formed signal; for each of the two input channels an additive model or a multiplicative model is used for a middle layer of the probabilistic layered network model to generate a speech probability for the intermediate layer; for the beam-formed signal, a speech probability conditioned on signal classification features of the beam-formed signal is obtained by mapping the signal classification features to a probability value using a map function and a time-recursive update; and/or, a time-recursive average is used to update the speech probability of the beam-formed signal.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
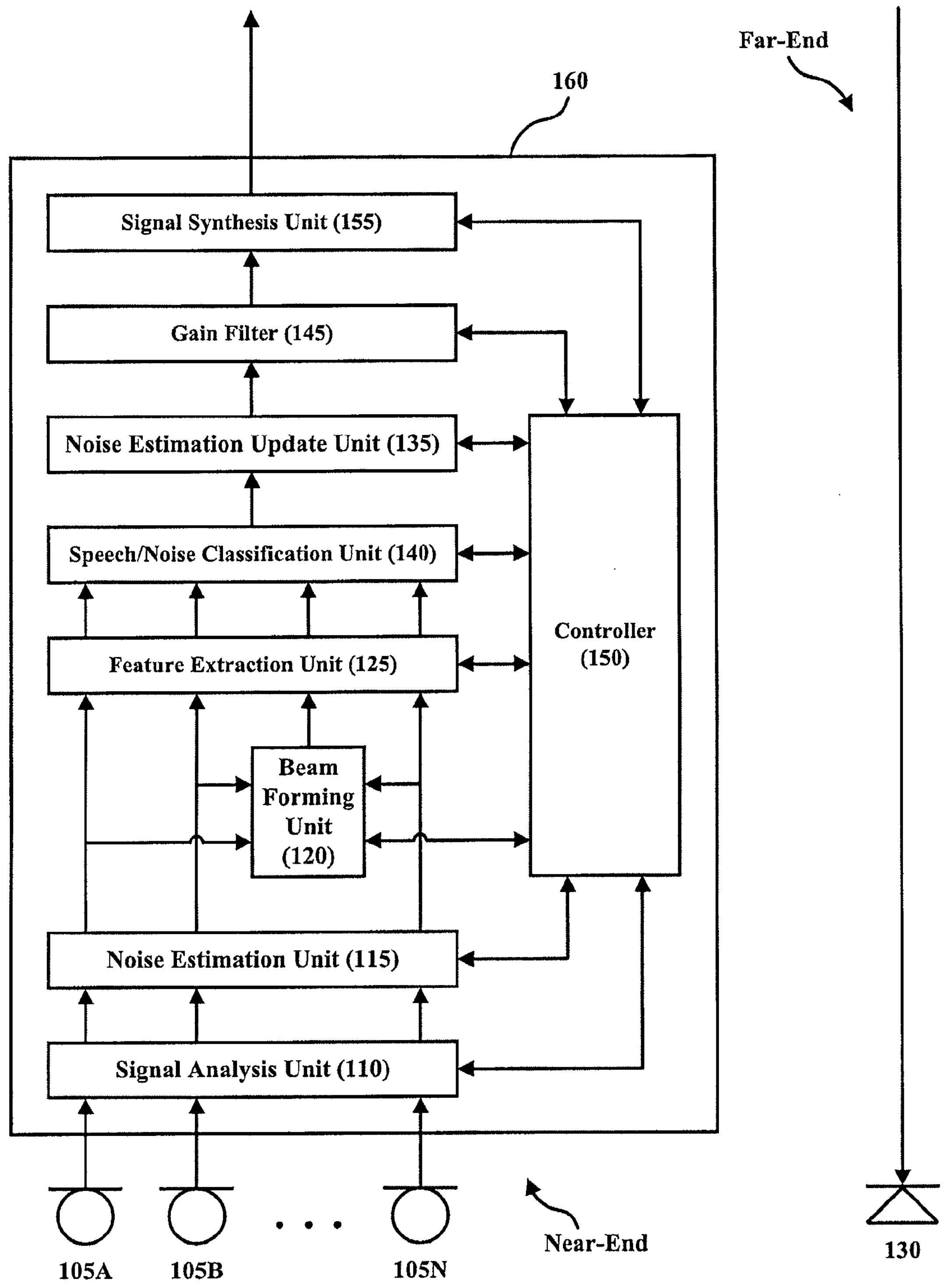
FIG. 1 is a block diagram of an example multi-channel noise suppression system in which one or more aspects described herein may be implemented.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Noise suppression aims to remove or reduce surrounding background noise to enhance the clarity of the intended audio thereby enhancing the comfort of the listener. In at least some embodiments of the present disclosure, noise suppression occurs in the frequency domain and includes both noise estimation and noise filtering processes. In scenarios involving high non-stationary noise levels, relying only on local speech-to-noise ratios (SNRs) to drive noise suppression often incorrectly biases a likelihood/probability determination of speech and noise presence. As will be described in greater detail herein, a process is provided for updating and adapting a speech/noise probability measure, for each input frame and frequency of an audio signal, that incorporates multiple speech/noise classification features (e.g., "signal classification features" or "noise-estimation features" as also referred to herein) from multiple input channels (e.g., microphones or similar audio capture devices) for an overall speech/noise classification determination. The architecture and framework for multi-channel speech/noise classification described herein provides for a more accurate and robust estimation of speech/noise presence in the frame. In the following description, "speech/noise classification features," "signal classification features," and "noise-estimation features" are interchangeable and refer to features of an audio signal that may be used (e.g., measured) to classify the signal, for each frame and frequency, into a state of either speech or noise.

Aspects and embodiments of the present disclosure relate to systems and methods for speech/noise classification using multiple features with multiple input channels (e.g., microphones). At least some embodiments described herein provide an architecture that may be implemented with methods and systems for noise suppression in a multi-channel environment where noise suppression is based on an estimation of the noise spectrum. In such noise suppression methods and systems, the noise spectrum may be estimated based on a model that classifies each time/frame and frequency component of a received input signal as speech or noise by using a speech/noise probability (e.g., likelihood) function. The speech/noise probability function estimates a speech/noise probability for each frequency and time bin of the received input signal, which is a measure of whether the received frame, at a given frequency, is likely speech (e.g., an individual speaking) or noise (e.g., office machine operating in the background). A good estimate of this speech/noise classification is important for robust estimation and update of background noise in noise suppression algorithms. The speech/noise classification can be estimated using various features of the received frame, such as spectral shape, average likelihood ratio (LR) factor, spectral template, peaks frequencies, local SNR, etc., all of which are good indicators as to whether a frequency/time bin is likely speech or noise.

For robust classification, multiple audio signal features should be incorporated into the speech/noise probability determination. When multiple input channels are involved, the difficulty lies in figuring out how to fuse (e.g., combine) the multiple features from the multiple channels. As described above, conventional approaches for multi-channel noise suppression focus on a beam-forming component (e.g., signal), which is a time-delayed sum of the two (or more) input channel signals. Noise estimation and speech enhancement process are then based on this combined/beam-formed input signal. A problem with these conventional approaches is that the beam-forming may not be effective. For example, if a user moves around, or the room filter (and hence time-delays) are difficult to estimate, then reliance on the beam-formed signal is not effective at reducing noise that may be present. Furthermore, conventional approaches to multi-channel noise suppression do not incorporate multiple audio signal features to estimate the speech/noise classification as is done in the numerous embodiments described herein.

In the methods and systems described herein, the beam-formed signal is used as only one input for the speech/noise classification determination. The direct input signals from the channels (e.g., the microphones) are also used. As will be further described below, the present disclosure provides a framework and architecture for combining information (e.g., feature measurements and speech/noise probability determinations) from all the channels involved, including the beam-formed signal.

FIG. 1 illustrates an example multi-channel noise suppression system and surrounding environment in which one or more aspects of the present disclosure may be implemented. As shown in FIG. 1, a noise suppression module 160 may be located at the near-end environment of a signal transmission path comprised of multiple channels indicated by capture devices 105A, 105B through 105N (where "N" is an arbitrary number). The far-end environment of the signal transmission path may include a render device 130. Although the example embodiment shown includes only one far-end channel with a single render device (e.g., render device 130), other embodiments of the disclosure may include multiple far-end channels with multiple render devices similar to render device 130.

In some embodiments, the noise suppression module 160 may be one component in a larger system for audio (e.g., voice) communications or audio processing. Although referred to herein as a "module," noise suppression module 160 may also be referred to as a "noise suppressor" or, in the context of a larger system, a "noise suppression component." The noise suppression module 160 may be an independent component in such a larger system or may be a subcomponent within an independent component (not shown) of the system. In the example embodiment illustrated in FIG. 1, the noise suppression module 160 is arranged to receive and process inputs (e.g., noisy speech signals) from the capture devices 105A, 105B through 105N, and generate output to, e.g., one or more other audio processing components (not shown) located at the near-end environment. These other audio processing components may be acoustic echo control (AEC), automatic gain control (AGC), and/or other voice quality improvement components. In some embodiments, these other audio processing components may receive inputs from the capture devices 105A, 105B through 105N prior to the noise suppression module 160 receiving such inputs.

Each of the capture devices 105A, 105B through 105N may be any of a variety of audio input devices, such as one or more microphones configured to capture sound and generate input signals. Render device 130 may be any of a variety of audio output devices, including a loudspeaker or group of loudspeakers configured to output sound of one or more channels. For example, capture devices 105A, 105B through 105N and render device 130 may be hardware devices internal to a computer system, or external peripheral devices connected to a computer system via wired and/or wireless connections. In some arrangements, capture devices 105A, 105B through 105N and render device 130 may be components of a single device, such as a speakerphone, telephone handset, etc. Additionally, capture devices 105A, 105B through 105N and/or render device 130 may include analog-to-digital and/or digital-to-analog transformation functionalities.

In at least the embodiment shown in FIG. 1, the noise suppression module 160 includes a controller 150 for coordinating various processes and timing considerations among and between the components and units of the noise suppression module 160. The noise suppression module 160 may also include a signal analysis unit 110, a noise estimation unit 115, a beam-forming unit 120, a feature extraction unit 125, a speech/noise classification unit 140, a noise estimation update unit 135, a gain filter 145, and a signal synthesis unit 155. Each of these units and components may be in communication with controller 150 such that controller 150 can facilitate some of the processes described herein. Additional details of various units and components shown as forming part of the noise suppression module 160 will be further described below.

In some embodiments of the present disclosure, one or more other components, modules, units, etc., may be included as part of the noise suppression module 160, in addition to or instead of those illustrated in FIG. 1. Also, various components of the noise suppression module 160 may be combined into one or more other components or parts, and also may be duplicated and/or separated into multiple components or parts. For example, at least one embodiment may have the noise estimation unit 115 and the noise estimation update unit 135 combined into a single noise estimation unit. Additionally, some of the units or components shown in FIG. 1 may be subunits or subcomponents of each other. For example, the feature extraction unit 125 may be a part of the speech/noise classification unit 140. The names used to identify the units and components included as part of noise suppression module 160 (e.g., signal analysis unit, noise estimation unit, speech/noise likelihood unit, etc.) are exemplary in nature, and are not in any way intended to limit the scope of the disclosure.

The signal analysis unit 110 shown in FIG. 1 may be configured to perform various pre-processing steps on the input frames received from each of the channels 105A, 105B, through 105N so as to allow noise suppression to be performed in the frequency domain, rather than in the time-domain. For example, in some embodiments of the disclosure the signal analysis unit 110 may process each received input frame through a buffering step, where the frame is expanded with previous data (e.g., a portion of the previous frame of the audio signal), and then through windowing and Discrete Fourier Transform (DFT) steps to map the frame to the frequency domain.

In various embodiments of the present disclosure, the methods, systems, and algorithms described herein for determining a speech/noise probability are implemented by the speech/noise classification unit 140. As shown in FIG. 1, the speech/noise classification unit 140 generates output directly to noise estimation update unit 135. In at least some arrangements, the speech/noise probability generated by speech/noise classification unit 140 is used to directly update the noise estimate (e.g., the initial noise estimate generated by noise estimation unit 115) for each frequency bin and time-frame of an input signal. As such, the speech/noise probability generated by speech/noise classification unit 140 should be as accurate as possible, which is at least part of the reason various embodiments of the disclosure incorporate multiple feature measurements into the determination of the speech/noise probability, as will be described in greater detail below.

Following the noise estimate update performed by the noise estimation update unit 135, an input frame is passed to the gain filter 145 for noise suppression. In one arrangement, the gain filter 145 may be a Wiener gain filter configured to reduce or remove the estimated amount of noise from the input frame. The gain filter may be applied on any one of the input (e.g., microphone) channels 105A, 105B, through 105N, on the beam-formed signal from beam-forming unit 120, or on any combination thereof.

The signal synthesis unit 155 may be configured to perform various post-noise suppression processes on the input frame following application of the gain filter 145. In at least one embodiment, upon receiving a noise-suppressed input frame from the gain filter 145, the signal synthesis unit 155 may use inverse DFT to convert the frame back to the time-domain, and then may perform energy scaling to help rebuild the frame in a manner that increases the power of speech present after suppression. For example, energy scaling may be performed on the basis that only input frames determined to be speech are amplified to a certain extent, while frames found to be noise are left alone. Because noise suppression may reduce the speech signal level, some amplification of speech segments via energy scaling by the signal synthesis unit 155 is beneficial. In one arrangement, the signal synthesis unit 155 is configured to perform scaling on a speech frame based on energy lost in the frame due to the noise estimation and filtering processes.

Figure 2:
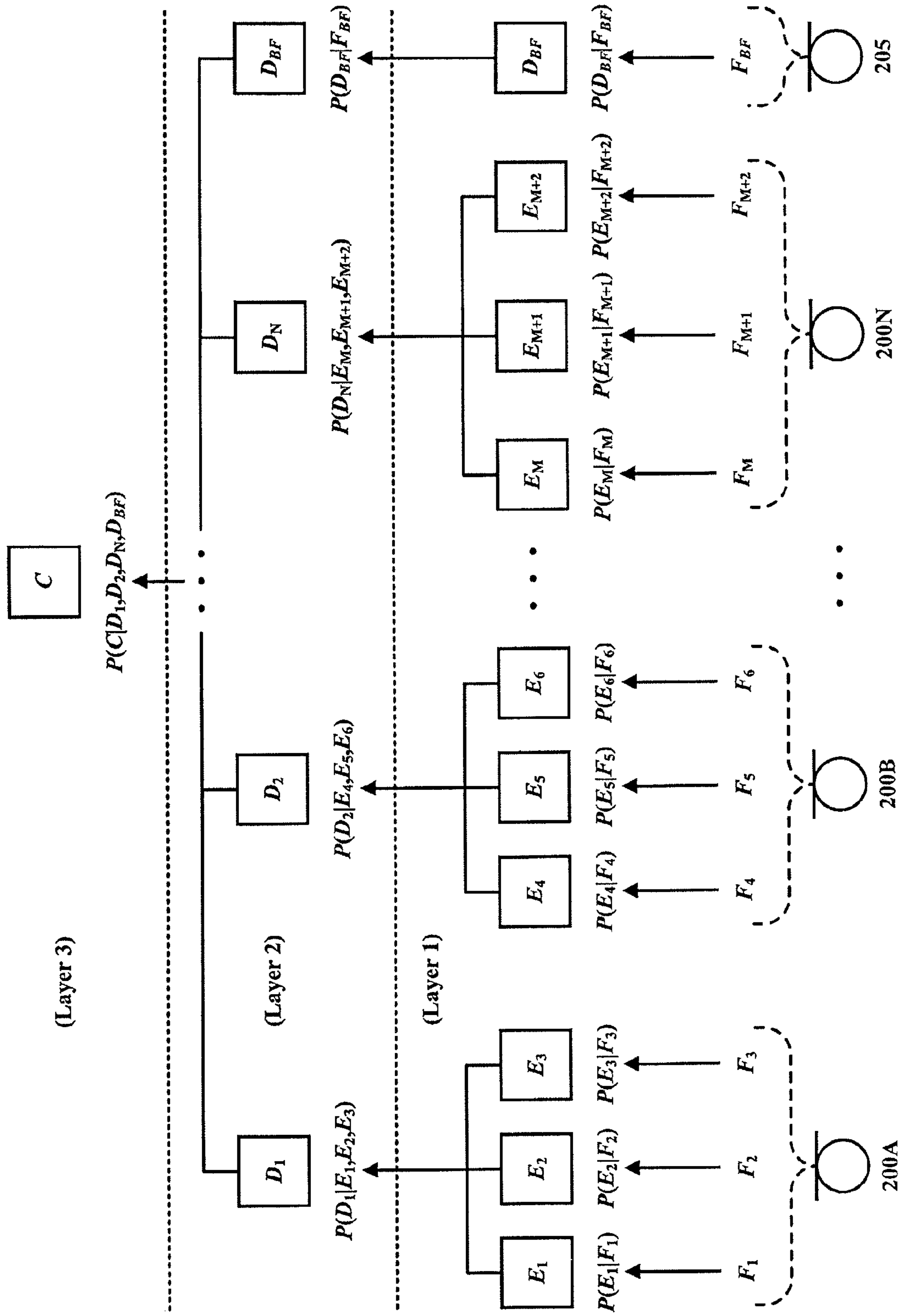
FIG. 2 is a schematic diagram of an example architecture for a speech/noise classification model using multiple features with multiple channels according to one or more embodiments described herein.

FIG. 2 illustrates an example architecture for a speech/noise classification model using multiple features with multiple input channels according to one or more embodiments of the present disclosure. The classification architecture shown in FIG. 2 may be implemented in a multi-channel noise suppression system (e.g., the noise suppression system illustrated in FIG. 1) where a speech/noise probability is directly used to update a noise estimate (e.g., a speech/noise probability from speech/noise classification unit 140 being output to noise estimation update unit 135 shown in FIG. 1) for every frequency bin and time-frame of a received signal.

The example architecture shown in FIG. 2 is based on a three-layer probabilistic network model. The network model contains dependencies that control the flow of data from each of the input channels (e.g., microphones) 200A, 200B, through 200N, and beam-formed input signal 205, to the final speech/noise classification determination for the audio signal, denoted as block C.

The first (e.g., bottom) layer of the classification architecture, indicated as "Layer 1" in FIG. 2, incorporates individual features of the input signal received at each of the input channels 200A, 200B, through 200N, as well as, one or more features of the beam-formed signal 205. For example, signal classification features $F_1$, $F_2$, and $F_3$ measured for a frame of the (noisy) speech signal input from channel 200A, are used in Layer 1 to map the signal to a state of speech or noise, indicated by $E_1$, $E_2$, and $E_3$. Similarly, signal classification features $F_3$, $F_4$, and $F_5$ measured for the frame of the (noisy) speech signal input from channel 200B, are used in Layer 1 to map the signal to a state of speech or noise as indicated by $E_4$, $E_5$, and $E_6$. The signal classification features measured for the frame are used in the same manner described above with respect to channels 200A and 200B for any other channels that may be present in addition to channels 200A and 200B, as illustrated for channel 200N in FIG. 2. The mapping of the signal to a classification state of speech or noise (e.g., $E_1$, $E_2$, and $E_3$) using each of the individual features of each channel will be described in greater detail below.

The second (e.g., middle) layer of the classification architecture, indicated as "Layer 2" in FIG. 2, combines the multiple features of each of the input channels 200A, 200B, through 200N, as well as, the one or more features of the beam-formed signal 205. As shown in Layer 2, each of $D_1$, $D_2$, up through $D_N$, represent the best estimate of the signal frame classification as speech or noise coming from channels 200A, 200B, through 200N, respectively, while $D_{BF}$ represents the best estimate of the classification as speech or noise based on the beam-formed signal 205. Each of the "D" speech/noise classification states of Layer 2 is a function of the "E" states determined at Layer 1 of the network model. For example, $D_1$ is an estimate of the speech/noise state for the signal frame from input channel 200A and is determined as a function of the $E_1$, $E_2$, and $E_3$ speech/noise classification states, which are in turn based on the measured features of the frame and the transitional probabilities $P(E_i|F_i)$, discussed in greater detail below.

In the third (e.g., top) layer of the classification architecture, indicated as "Layer 3" in FIG. 2, the combined estimates of the signal frame classification from each of the channels 200A, 200B, through 200N, and from beam-formed signal 205, are combined into a final speech/noise probability for the signal frame, indicated as C. In at least some embodiments described herein, C denotes the state of the signal frame as either speech or noise, depending on the best estimates combined from each of the channels in Layer 2. Similar to the relationship between Layers 1 and 2 described above, the "C" speech/noise classification state in Layer 3 is a function of each of the "D" states from Layer 2 of the network model. The hidden "D" states are, in turn, functions of the lower level "E" states, which are directly functions of the input features, and the transitional probabilities $P(E_i\, F_t)$. Each of the layers illustrated in FIG. 2, as well as, the various computational components contained therein, will be described in greater detail below.

According to embodiments described herein, the probability of a speech/noise state is obtained for each frequency k bin and time-frame t of an audio signal input from each of the channels 200A, 200B, through 200N. In one example arrangement, the received signal is processed in blocks (e.g., frames) of 10 milliseconds (ms), 20 ms, or the like. The discrete time index t may be used to index each of these blocks/frames. The audio signal in each of theses frames is then transformed into the frequency domain (e.g., using Discrete Fourier Transform (DFT) in the signal analysis unit 110 shown in FIG. 1), with the frequency index k denoting the frequency bins.

For purposes of notational simplicity, the following description of the layered network model shown in the example architecture of FIG. 2 is based on a two-channel arrangement (e.g., channels 200A and 200B). It should be understood that these descriptions are also applicable in arrangements involving more than two channels, as indicated by the inclusion of channels 200A, 200B, up through 200N in the architecture of FIG. 2.

A speech/noise probability function for a two-channel arrangement may be expressed as:

$$P(C|Y_1(k,t),Y_2(k,t),\{F_i\})=P(Y_1(k,t),Y_2(k,t)|C)P(C|\{F_i\})p(\{F_i\})$$

where $Y_i(k,t)$ is the observed (noisy) frequency spectrum for the input channel (e.g., microphone) i, at time/frame index t, for frequency k, and C is the discrete classification state that denotes whether the time-frequency bin is speech (e.g., C=1) or noise (e.g., C=0). The quantities $\{F_i\}$ are a set of features (e.g., "signal classification features," which may include $F_1$ through $F_6$ shown in FIG. 2) used to classify the time-frequency bin into either a speech or noise state, and $p(\{F_i\})$ is a prior term on the feature set, which may be set to 1. It should be noted that the notation $\{F_i\}$ means the set of signal classification features, for example: $F_1,F_2,F_3,F_4,F_5,F_6,F_{BF}$.

The first term in the above expression, $P(Y_1(k,t), Y_2(k,t)|C)$, can be determined based on, for example, a Gaussian assumption for the probability distribution of the observed spectrums $\{Y_i(k,t)\}$, and an initial noise estimation. Other assumptions on the distribution of the spectrums $\{Y_i(k,t)\}$, such as super-Gaussian, Laplacian, etc., may also be invoked. The initial noise estimation may be used to define one or more parameters of the probability distribution of the spectrums $\{Y_i(k,t)\}$. An example method for computing the initial noise estimation is described in greater detail below. The second term in the expression, $P(C|\{F_i\})$, is the speech/noise probability, conditioned on the features derived from the channel inputs (e.g., the input signals from channels 200A and 200B shown in FIG. 2). The quantity of $P(C|\{F_i\})$ is sometimes referred to herein as the "speech/noise classifier," and is present in various forms at each of the layers of the model shown in FIG. 2. For example (still referring to the two-channel scenario), blocks $E_1$ through $E_6$ each represent a classification state of speech or noise based on their respective speech/noise classifiers $P(E_1|F_1)$ through $P(E_6|F_6)$. The term $P(C|\{F_i\})$ is also sometimes referred to herein as the "feature-based prior term," which will be described in greater detail below. It should be noted that probabilities denoted as $P(x|y)$ in the present disclosure are defined as the conditional probability of being in state "x" given the state "y". If both states "x" and "y" are discrete speech/noise states, then the term "state-conditioned transition probability" may be used. For the case where "x" is the discrete state (e.g., x=C, D, or E) and "y" is the feature data (e.g., y={F}), the term "speech probability" or "feature-based speech probability" may be used. The terms "condition" or "transition" may be removed at various times in the following description simply for convenience. Additionally, in the following description the terms "probability" and "classifier" may be used interchangeably to refer to the conditional probability $P(x|y)$. Further, use of the term "classifier" to refer to the conditional probability $P(x|y)$ is intended to mean probabilistic classifier. A deterministic classifier (e.g., a decisive rule that indicates the state is either "0" or "1") may be obtained by thresholding the conditional probability.

In one or more embodiments described herein, an initial noise estimation may be derived based on a quantile noise estimation. In at least one example, the initial noise estimation may be computed by the noise estimation unit 115 shown in FIG. 1, and may be controlled by a quantile parameter (which is sometimes denoted as q). In another embodiment, the initial noise estimation may be derived from a standard minimum statistics method. The noise estimate determined from initial noise estimation is only used as initial condition to subsequent processing for improved noise update/estimation, as will be further described below.

Following the determination of speech/noise probability function $P(C|Y_1(k,t), Y_2(k,t))$, a noise estimation and update process is performed, as indicated by the noise estimation update unit 135 shown in FIG. 1. In at least one embodiment, the noise estimate update (e.g., performed by the noise estimation update unit 135 shown in FIG. 1) may be a soft-recursive update based on the speech/noise probability function:

$$|N(k,t)|=\gamma_n|N(k,t-1)|+(1-\gamma_n)A$$

$$A=P(C=1|Y_1(k,t),Y_2(k,t),\{F_i\})|N(k,t-1)|+P(C=0|Y_1(k,t),Y_2(k,t),\{F_i\})|Z(k,t)|$$

where $|N(k,t)|$ is the estimate of the magnitude of the noise spectrum, for frame/time m and frequency bin k. The parameter $\gamma_n$ controls the smoothing of the noise update, and the second term in the first expression above updates the noise with both the input spectrum and previous noise estimation, weighted according to the probability of speech/noise. The state C=1 denotes state of speech, and C=0 denotes state of noise. The quantity $|Z(k,t)|$ is the magnitude of the input spectrum used for the noise update which, as described above for the gain filter, may be any one of the input (e.g., microphone) channel's magnitude spectrum (e.g., input channels 200A, 200B, through 200N shown in FIG. 2), the magnitude of the beam-formed signal 205, or on any combination thereof.

The feature set $\{F_i\}$ includes signal classification features for each channel input and, in at least some embodiments, an additional one or more signal classification features $F_{BF}$ derived from a combined/beam-formed signal 205 shown in FIG. 2. In one or more embodiments, the feature set $\{F_i\}$ for each of the channel inputs may include measured quantities for average likelihood ratio (LR) factor, spectral shape, and spectral template. In some arrangements, the average LR factor may be based on local signal-to-noise ratios (SNR) and the spectral shape may be a measure of spectral flatness based on a harmonic model of speech. Additional details regarding these particular signal classification features, including some example computational processes involved in obtaining measurements for these features are provided below.

In other embodiments, numerous other features of the channel inputs may also be used in addition to or instead of these three example features. Furthermore, in various embodiments described herein the one or more features for the combined/beam-formed input, $F_{BF}$, may include any of the same features as the channel inputs, or instead may include other feature quantities different from those of the channel inputs.

The $P(C|\{F_1\})$ term may be expressed as:

$$P(C|F_1, F_2, F_3, F_4, F_5, F_6, F_{BF}) = \sum_{\{D_1,D_2,D_3\}} P(C|D_1, D_2, D_3)P(D_1|\{F_i\})P(D_2|\{F_i\})P(D_3|\{F_i\})$$

where the intermediate states $\{D_1, D_2, D_3\}$ denote the (internal) speech/noise state (e.g., D=1 for speech and D=0 for noise). The quantity $P(D_j|\{F_i\})$ is the probability of speech/noise given the set of features $\{F_i\}$. The quantity $P(C|D_1,D_2,D_3)$ is referred to as a state-conditioned transition probability in the following description below.

A model describing how the individual features from the channel inputs propagate to the Layer 3 (the top layer) speech/noise classifier may be expressed using another set of discrete states $\{E_i\}$, and corresponding state-conditioned transition probabilities (e.g., $P(D_1|E_1,E_2,E_3)$ as follows:

$$P(C|F_1, F_2, F_3, F_4, F_5, F_6, F_{BF}) = \sum_{\{D_1,D_2,D_3\}} \sum_{\{E_1,E_2,E_3,E_4,E_5,E_6\}} P(C|D_1, D_2, D_3)P(D_1|E_1, E_2, E_3) P(D_2|E_4, E_5, E_6)P(D_3|F_{BF})P(E_1|F_1)P(E_2|F_2) P(E_3|F_3)P(E_4|F_4)P(E_5|F_5)P(E_6|F_6)$$

The above expression corresponds to the three-layered network model shown in FIG. 2. Networks such as this may be considered part of the general class of Bayesian networks. The speech/noise state, C, and all of the hidden states, $D_i$, $E_i$, are discrete values (e.g., either 0 or 1), whereas the feature quantities of the channel inputs may be any value in some range, depending on the particular feature involved. It should be understood that in one or more embodiments of the disclosure any number of features and any number of channel inputs (e.g., any number of channels comprising the transmission path) may also be used in addition to or instead of the example number of features and channel inputs described above. The use of three layers for the network model, combined with the dependencies of the speech/noise states from one layer to the speech/noise states of the next layer, are what determine the particular flow of data from the input features to the final speech/noise state, C, as illustrated in FIG. 2.

The quantity $P(C|D_1,D_2,D_3)$, which is included in the above expression and illustrated in FIG. 2, controls how the information and data (e.g., the feature quantities, the speech/noise states, etc., at each of the layers) is combined from the multiple channel inputs.

In various embodiments of the present disclosure, the layered network model described herein may be implemented in one or more different user-scenarios or arrangements. For example, in a two-channel (e.g., two microphone) scenario, a first channel may be configured to sample (e.g., receive) noisy speech while a second channel is configured to sample only noise. In such an arrangement, $P(C|D_1,D_2,D_3)$ may only use information from the first channel input. In another example involving a two-channel scenario, both channels may be configured to sample speech and noise, in which case $P(C|D_1, D_2,D_3)$ may use information from both channel inputs, as well as information or data from a beam-formed input (e.g., beam-formed signal 205 shown in FIG. 2). In an arrangement where both channels are configured to sample speech and noise, but where the beam-forming is unreliable (e.g., where the estimate of the relative time delay (e.g., the channel/room filter) is not reliable, such as when the user moves around too frequently), $P(C|D_1,D_2,D_3)$ may only combine the information from the two channel inputs and not consider data or information from the beam-formed signal. On the other hand, where feature(s) derived from the beam-formed signal are determined to be useful, and no direct use is made of the inputs from the individual channels, then the network model may select features only from the beam-formed signal.

Additionally, in the various scenarios and arrangements described above, a user may control how information or data from each channel is weighted when combined in the layered network model. For example, input from different channels (e.g., any of the channels 200A, 200B, up through 200N shown in FIG. 2) may be weighted according to one or more implementation or design preferences of the user.

According to at least one embodiment, a structure for the fusion or combination term (e.g., the top layer of the network architecture, indicated as Layer 3 in FIG. 2) may be as follows, with the weights $\{\lambda_i\}$ being adaptable to the particular system conditions or different user scenarios involved:

$$P(C|D_1,D_2,D_3)=\lambda_1\delta(C|D_1)+\lambda_2\delta(C|D_2)+\lambda_3\delta(C|D_3)$$

where $\delta(x)$ is defined as $\delta(x=0)=1$, and otherwise $\delta(x)=0$. As described above, $\lambda_1$, $\lambda_2$, and $\lambda_3$ are weighting terms that may be controlled by a user, or based on a user's preferences or on the configuration/location of the input channels (e.g., microphones).

Single-Channel Scenario

Figure 3:
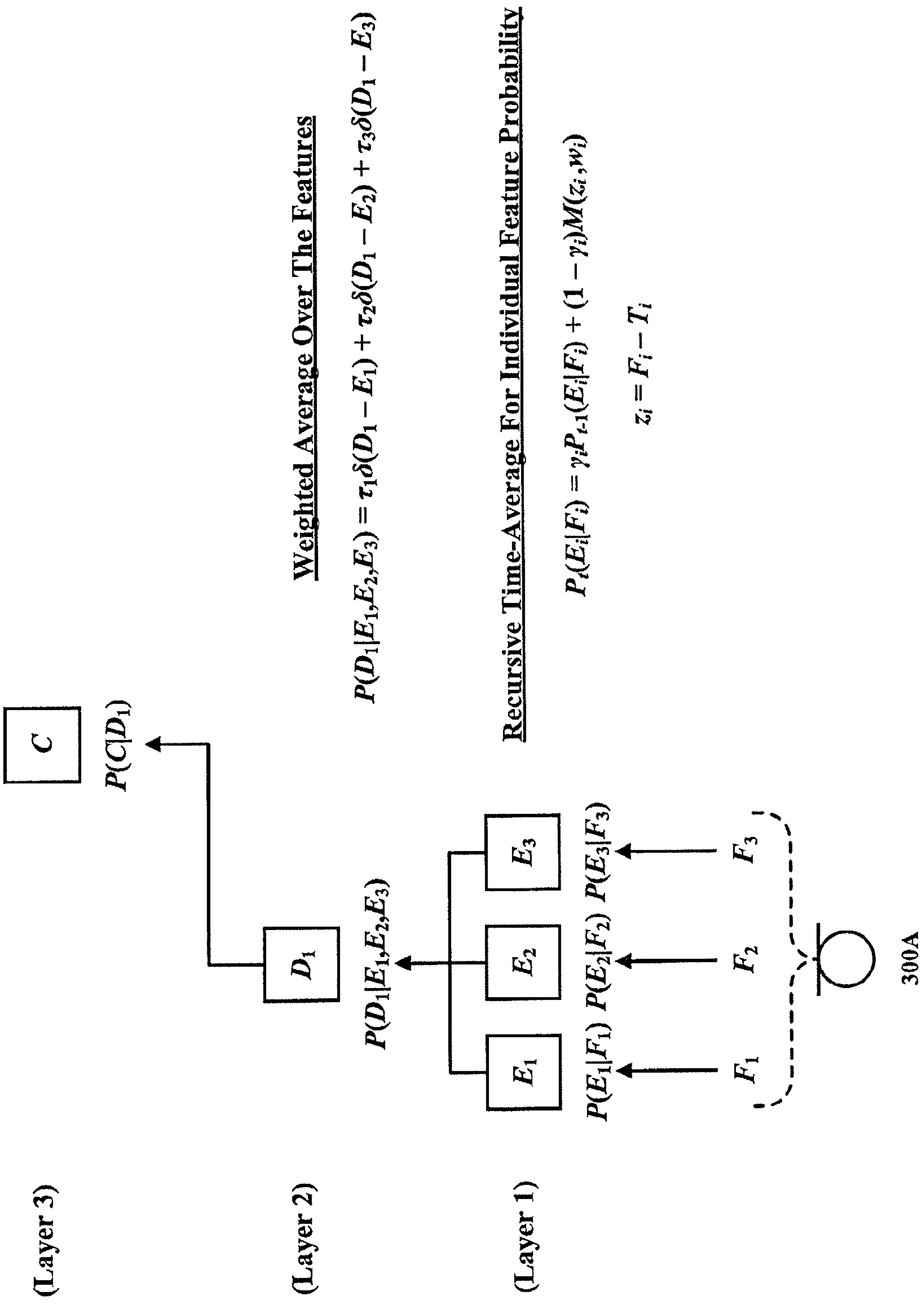
FIG. 3 is a schematic diagram illustrating a subset of the example architecture for a speech/noise classification model of FIG. 2 according to one or more embodiments described herein.

FIG. 3 illustrates a single-channel arrangement or subset of an example architecture for a speech/noise classification model using multiple features according to one or more embodiments of the present disclosure. The example single-channel arrangement shown in FIG. 3 is similar to the arrangement of channel 200A shown in FIG. 2 and described above. The single-channel arrangement shown in FIG. 3 includes an input channel 300A and an information or data flow through three layers, denoted as Layers 1, 2, and 3. Three signal classification features $F_1$, $F_2$, and $F_3$ may be measured for a frame of a (noisy) speech signal input from channel 300A, and may be used in Layer 1 to map the signal to a state of speech or noise, indicated by $E_1$, $E_2$, and $E_3$.

In one example, the three signal classification features considered in the single-channel scenario of FIG. 3 include average LR factor ($F_1$), spectral flatness measure ($F_2$) and spectral template measure ($F_3$).

In at least one embodiment described herein, the signal classification feature corresponding to the LR factor (e.g., $F_1$) is the geometric average of a time-smoothened likelihood ratio (LR):

$$F_1 = \log\left(\prod_k \tilde{\Delta}(k, t)\right)^{1/N} = \frac{1}{N}\sum_{k=1}^{N} \log(\tilde{\Delta}(k, t))$$

where N is the number of frequency bins used in the average, $\tilde{\Delta}$(k,t) is the time-smoothened likelihood ratio, obtained as a recursive time-average from the LR factor, Δ(k,t), $$\log(\tilde{\Delta}k,t))=\gamma_{lrt}\log(\tilde{\Delta}(k,t-1))+(1-\gamma_{lrt})\log(\Delta(k,t))$$

The LR factor is defined as the ratio of the probability of the input spectrum being in a state of speech over the probability of the input spectrum being in a state of noise, for a given frequency and time/frame index:

$$\Delta(k, t) = \frac{P(Y(k, t) \mid C = 1)}{P(Y(k, t) \mid C = 0)} = \frac{\exp\left(\frac{\rho(k, t)\sigma(k, t)}{(1 + \rho(k, t))}\right)}{(1 + \rho(k, t))}$$

The two quantities in the second expression above denote the prior and post SNR, respectively, which may be defined as:

$$\sigma(k, t) = \frac{|Y(k, t)|}{|N(k, t)|}$$

$$\rho(k, t) = \frac{|X(k, t)|}{|N(k, t)|}$$

where |N(k,t)| is the estimated noise magnitude spectrum, |Y(k,t)| is the magnitude spectrum of the input (noisy) speech, and |X(k,t)| is the magnitude spectrum of the (unknown) clean speech. In one embodiment, the prior SNR may be estimated using a decision-directed update:

$$\rho(k, t) = \gamma_{dd} H(k, t-1)\frac{|Y(k, t-1)|}{\langle|N(k, t-1)|\rangle} + (1 - \gamma_{dd})\max(\sigma(k, t) - 1, 0)$$

where H(k,t−1) is the gain filter (e.g., Wiener gain filter) for the previous processed frame, and |Y(k,t−1)| is the input magnitude spectrum of the noisy speech for the previous frame. In at least this example, the above expression may be taken as the decision-directed (DD) update of the prior SNR with a temporal smoothing parameter $\gamma_{dd}$.

In at least one embodiment, the spectral flatness feature is obtained as follows. For purposes of obtaining a spectral flatness measurement ($F_2$), it is assumed that speech is likely to have more harmonic behavior than noise. Whereas the speech spectrum typically shows peaks at the fundamental frequency (pitch) and harmonics, the noise spectrum tends to be relatively flat in comparison. Accordingly, measures of local spectral flatness may collectively be used as a good indicator/classifier of speech and noise. In computing spectral flatness, N represents the number of frequency bins and B represents the number of bands. The index for a frequency bin is k and the index for a band is j. Each band will contain a number of bins. For example, the frequency spectrum of 128 bins can be divided into 4 bands (e.g., low band, low-middle band, high-middle band, and high band) each containing 32 bins. In another example, only one band containing all the frequencies is used. The spectral flatness may be computed as the ratio of the geometric mean to the arithmetic mean of the input magnitude spectrum:

$$F_2 = \frac{\left(\prod |Y(k, t)|\right)^{1/N}}{\frac{1}{N}\sum |Y(k, t)|}$$

where N represents the number of frequencies in the band. The computed quantity $F_2$ will tend to be larger and constant for noise, and smaller and more variable for speech.

In at least one embodiment, the third signal classification feature (e.g., $F_3$) may be determined as follows. In addition to the assumptions about noise described above for the spectral flatness measure ($F_2$), another assumption that can be made about the noise spectrum is that it is more stationary than the speech spectrum. Therefore, it can be assumed that the overall shape of the noise spectrum will tend be the same during any given session. Proceeding under this assumption, a third signal classification feature, the spectral template difference measure ($F_3$), can be said to be a measure of the deviation of the input spectrum from the shape of the noise spectrum.

In at least some embodiments, the spectral template difference measure ($F_3$) may be determined by comparing the input spectrum with a template learned noise spectrum. For example, the template spectrum may be determined by updating the spectrum, which is initially set to zero, over segments that have strong likelihood of being noise or pause in speech. A result of the comparison is a conservative noise estimate, where the noise is only updated for segments where the speech probability is determined to be below a threshold. In other arrangements, the template spectrum may also be selected from a table of shapes corresponding to different noises. Given the input spectrum, Y(k,t), and the template spectrum, which may be denoted as a(k,t), the spectral template difference feature may be obtained by initially defining the spectral difference measure as:

$$J = \sum_k |Y(k, t) - (va(k, t) + u)|^2$$

where (v,u) are shape parameters, such as linear shift and amplitude parameters, obtained by minimizing J. Parameters (v,u) are obtained from a linear equation, and therefore are easily extracted for each frame. In some examples, the parameters account for any simple shift/scale changes of the input spectrum (e.g., if the volume increases). The feature is then the normalized measure, $$F_3 = \frac{J}{\text{Norm}}$$

where the normalization is the average input spectrum over all frequencies and over some time window of previous frames:

$$\text{Norm} = \frac{1}{W}\sum_{t=0}^{W}\sum_{k}|Y(k,t)|^2$$

If the spectral template measure ($F_3$) is small, then the input frame spectrum can be taken as being "close to" the template spectrum, and the frame is considered to be more likely noise. On the other hand, where the spectral template difference feature is large, the input frame spectrum is very different from the noise template spectrum, and the frame is considered to be speech. It is important to note that the spectral template difference measure ($F_3$) is more general than the spectral flatness measure ($F_2$). In the case of a template with a constant (e.g., near perfectly) flat spectrum, the spectral template difference feature reduces to a measure of the spectral flatness.

Referring again to the subset of the speech/noise classification model shown in FIG. 3, for the single-channel arrangement, the quantity $P(C|\{F_i\})$ may be expressed as follows:

$$P(C|F_1, F_2, F_3) = \sum_{\{D_1\}}\sum_{\{E_1,E_2,E_3\}} P(C|D_1)P(D_1|E_1, E_2, E_3)P(E_1|F_1)P(E_2|F_2)p(E_3|F_3)$$

In any of the various embodiments described herein, one of two methods may be implemented for the flow of data and information for the middle and top layers, Layers 2 and 3, respectively, of the network architecture for the single-channel arrangement. These methods correspond to the following two models described below, where the first is an additive model and the second is a multiplicative model.

Method 1: Additive Middle Layer Model

For a single-channel arrangement, such as that illustrated in FIG. 3, one or more embodiments may implement an additive middle layer (e.g., Layer 2 shown in FIG. 3) model as follows:

$$P(C|D_1)=\delta(C|D_1)$$

$$P(D_1|E_1,E_2,E_3)=\tau_1\delta(D_1-E_1)+\tau_2\delta(D_1-E_2)+\tau_3\delta(D_1-E_3)$$

where $\{\tau_i\}$ are weight thresholds. The additive model refers to the structure used for the state-conditioned transition probability $P(D_1|E_1,E_2,E_3)$ in the above equation.

The speech/noise probability conditioned on the features, $P(C|\{F_i\})$, then becomes the following, which is derived using the above two expressions:

$$P(C|F_1,F_2,F_3)=\tau_1 P(C|F_1)+\tau_2 P(C|F_2)+\tau_3 P(C|F_3)$$

The individual terms $P(C|F_i)$ in the above expression are computed and updated for each input (noisy) speech frame as $$P_t(C|F_i)=\gamma_i P_{t-1}(C|F_i)+(1-\gamma_i)M(z_i,w_i)$$

$$z_i=F_i-T_i$$

where $\gamma_i$ is the time-averaging factor defined for each feature, and parameters $\{w_i\}$ and $\{T_i\}$ are thresholds that may be determined off-line or adaptively on-line. In at least one embodiment, the same time-averaging factor is used for all features, e.g., $\gamma_i=\gamma$.

Method 2: Multiplicative Middle Layer Model

In addition to the additive model for the middle layer described above, other embodiments involving a single-channel arrangement such as that illustrated in FIG. 3 may implement a multiplicative middle layer (e.g., Layer 2 shown in FIG. 3) model as follows:

$$P(C|D_1)=\delta(C-D_1)$$

$$P(D_1|E_1,E_2,E_3)=P(D_1|E_1)P(D_1|E_2)P(D_1|E_3)$$

The multiplicative model refers to the structure used for the state-conditioned transition probability $P(D_1|E_1,E_2,E_3)$ in the above equation.

The speech/noise probability conditioned on the features, $P(C|\{F_i\})$, then becomes the following, derived using the above two expressions:

$$P(C|F_1, F_2, F_3) = \sum_{E_1} P(C|E_1)P(E_1|F_1)\sum_{E_2} P(C|E_2)P(E_2|F_1)\sum_{E_3} P(C|E_3)P(E_3|F_1)$$

The above expression is a product of three terms, each of which has two components: $P(C|E_i)$ and $P(E_i|F_i)$. For the $P(E_i|F_i)$ components, the following model equations are used, which are the same as those described above for the additive model implementation:

$$P_t(E_i|F_i)=\gamma_i P_{t-1}(E_i|F_i)+(1-\gamma_i)M(z_i,w_i)$$

$$z_i=F_i-T_i$$

For the $P(C|E_i)$ components, the following model equations are used:

$$P(C=0|E_i=0)=q$$

$$P(C=0|E_i=1)=1-q$$

$$P(C=1|E_i)=1-P(C=0|E_i)$$

The single parameter q may be used to characterize the quantity $P(C|E_i)$, since the states $\{C, E_i\}$ are binary (0 or 1). The parameter q as defined above determined the probability of the state C being in a noise state given that the state $E_i$ in the previous layer is in a noise state. It may be determined off-line or may be determined adaptively on-line.

Multi-Channel Scenario

The following describes an implementation method for a multi-channel arrangement, such as that illustrated in FIG. 2. For purposes of the following description, a two-channel arrangement is used as an example; however, it should be understood that this implementation may also be used in arrangements involving more than two channels. The example two-channel arrangement used in the following description may be similar to an arrangement involving channels 200A and 200B, along with beam-formed signal 205, shown in FIG. 2. In this two-channel arrangement, information and data flow through three network model layers, denoted as Layers 1, 2, and 3.

In at least one example involving a two-microphone channel scenario, three signal classification features may be considered for each of the two direct channel inputs (e.g., channels 200A and 200B shown in FIG. 2) while one feature is considered for the beam-formed signal input (e.g., beam-formed signal 205 shown in FIG. 2). For the first microphone channel input, which is referred to as "channel 1" in this example, the following features may be used: average LR factor ($F_1$), spectral flatness measure ($F_2$) and spectral template measure ($F_3$). For the second microphone channel input, referred to as "channel 2" in this example, similar signal classification features may be used: average LR factor ($F_4$), spectral flatness measure ($F_5$) and spectral template measure ($F_6$). Additionally, for the beam-formed signal, average LR factor ($F_{BF}$) may be used as the one signal classification feature. In other two-channel scenarios, numerous other combinations and amounts of signal classification features may be used for each of the two direct channels (channels 1 and 2), and also for the beam-formed signal. For example, more than three (e.g., six) signal classification features may be used for channel 1 while less than three (e.g., two) signal classification features are used for channel 2, depending on whether certain feature measurements are determined to be more reliable than others or found to be not reliable at all. Also, while the present example uses average LR factor as the signal classification feature for the beam-formed signal, other examples may use various other signal classification features in addition to or instead of average LR factor.

The signal classification features $F_1$, $F_2$, $F_3$, $F_4$, $F_5$, $F_6$ may be measured for a frame of a (noisy) speech signal input from channels 1 and 2, along with signal classification feature $F_{BF}$ for the beam-formed signal, and may be used in Layer 1 to map the signal to a state of speech or noise for each input. In at least some embodiments described herein, the beam-formed signal (e.g., beam-formed signal 205 shown in FIG. 2) is a time-aligned superposition of the signals received at each of the direct input channels (e.g., channels 200A, 200B, up through 200N shown in FIG. 2). Because the beam-formed signal may have higher signal-to-noise ratio (SNR) than either of the individual signals received at the direct input channels, the average LR factor, which is a measure of the SNR, is one useful signal classification feature that may be used for the beam-formed input.

In the present example, the two-microphone channel implementation is based on three constraints, the first constraint being an additive weighted model for the top level (e.g., Layer 3) of the network architecture as follows:

$$P(C|D_1,D_2,D_3)=\lambda_1\delta(C-D_1)+\lambda_2\delta(C-D_2)+\lambda_3\delta(C-D_3)$$

where, as described above, $\delta(x)$ is defined as $\delta(x=0)=1$, and otherwise $\delta(x)=0$; and the weighting terms $\lambda_1$, $\lambda_2$, and $\lambda_3$ (collectively $\{\lambda_i\}$) may be determined based on various user-scenarios and preferences. The second constraint is that each of the inputs from channels 1 and 2 use the same method/model as in the single-channel scenario described above. The third constraint is that the beam-formed signal uses a method/model derived from the time-recursive update according to the following equations presented in the single-channel scenario description and reproduced as follows:

$$P_t(C|F_i)=\gamma_i P_{t-1}(C|F_i)+(1-\gamma_i)M(z_i,w_i)$$

$$z_i=F_i-T_i$$

Given the first constraint/condition described above, the speech/noise probability is then derived from the sum of three terms, corresponding to each of the three inputs (e.g., the inputs from channel 1, channel 2, and the beam-formed signal). As such, the speech/noise probability for the two-microphone channel scenario may be expressed as follows:

$$P(C|F_1,F_2,F_3,F_4,F_5,F_6,F_{BF})=\lambda_1 P(C|F_1,F_2,F_3)+\lambda_2 P(C|F_4,F_5,F_6)+\lambda_3 P(C|F_{BF})$$

Using the second constraint/condition, where $P(C|F_1,F_2,F_3)$ and $P(C|F_4,F_5,F_6)$ are determined from either the additive middle layer model or the multiplicative middle layer model described above, depending on which method is used for the single-channel case, the speech/noise probability equations for the first two terms above are completely specified. The additive and multiplicative methods used for the second constraint/condition are reproduced (in that order) as follows:

$$P(C|F_1,F_2,F_3)=\tau_1 P(C|F_1)+\tau_2 P(C|F_2)+\tau_3 P(C|F_3)$$

$$P(C|F_1,F_2,F_3)=\sum_{E_1}P(C|E_1)P(E_1|F_1)\sum_{E_2}P(C|E_2)P(E_2|F_1)\sum_{E_3}P(C|E_3)P(E_3|F_1)$$

The same equations and set of parameters (adapted accordingly) would also be used for the $P(C|F_4,F_5,F_6)$ term (the second channel).

Finally, using the third constraint/condition for the two-microphone channel scenario, the third term $P(C|F_{BF})$, based on the beam-formed input, is determined using the following:

$$P_t(C|F_{BF})=\gamma_{BF}P_{t-1}(C|F_{BF})+(1-\gamma_{BF})M(z_{BF},w_{BF})$$

$$z_{BF}=F_{BF}-T_{BF}$$

where $\gamma_{BF}$ is the time-averaging factor, $w_{BF}$ is a parameter for the sigmoid function, and $T_{BF}$ is a threshold. These parameter values are specific to the beam-forming input (e.g., there are generally different settings for the two direct input channels, which in some embodiments may be microphones or other audio capture devices).

Figure 4:
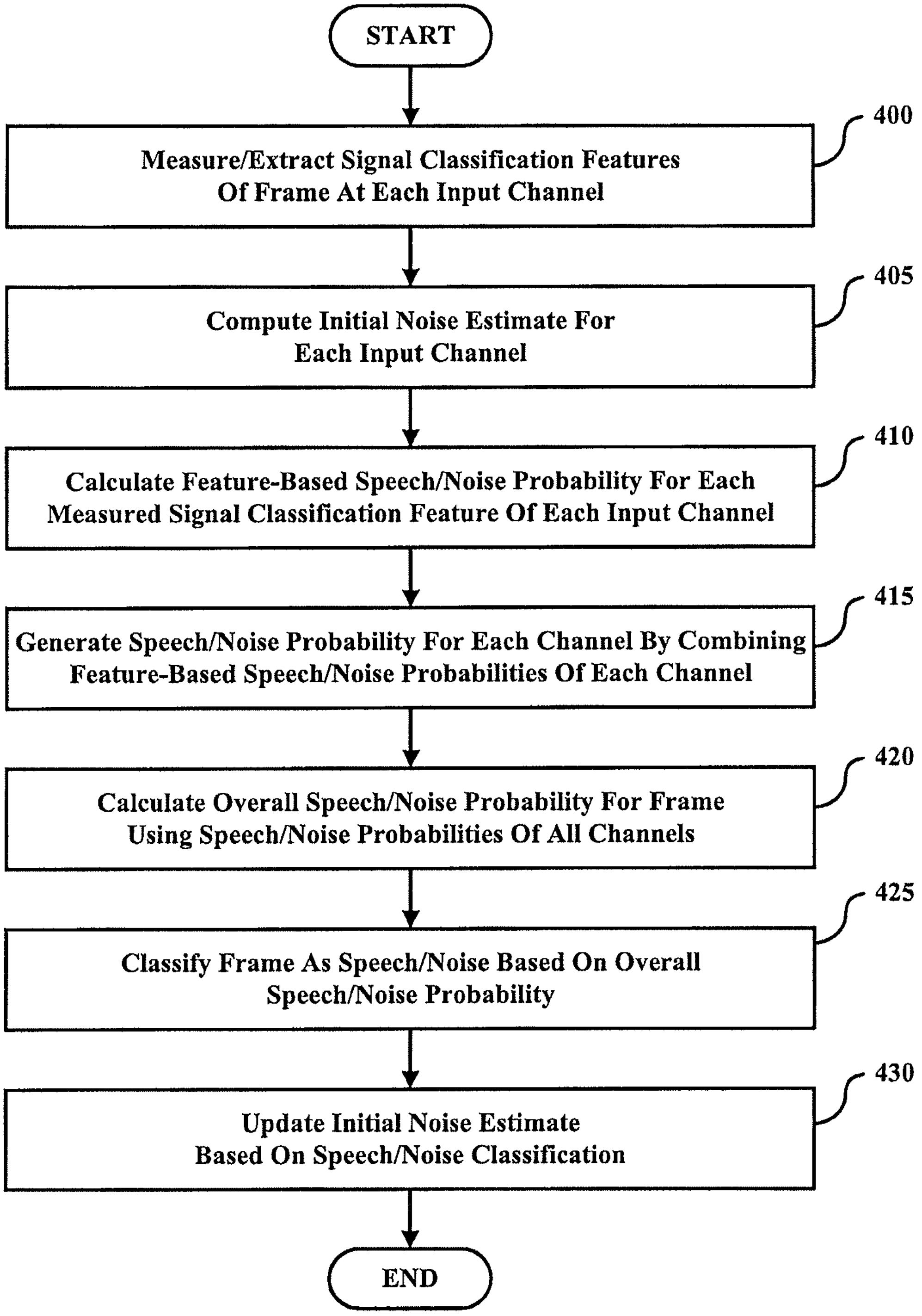
FIG. 4 is flow diagram illustrating an example process for combining multiple features from multiple channels to perform noise estimation based on deriving a speech/noise classification for an input audio signal according to one or more embodiments described herein.

FIG. 4 illustrates an example process for combining (e.g., fusing) multiple signal classification features data and information across multiple input channels to derive a speech/noise classification for an input audio signal (e.g., each successive frame of an audio signal) according to one or more embodiments of the present disclosure. The process illustrated in FIG. 4 combines data and information using a layered network model, such as that shown in FIG. 2 and described in detail above.

The process begins at step 400 where signal classification features of an input frame are measured/extracted at each input channel (e.g., each of input channels 200A, 200B, through 200N shown in FIG. 2). In at least some embodiments described herein, the signal classification features extracted for the frame at each input channel include average LR factor, spectral flatness measure, and spectral template measure. Additionally, as described above, one or more signal classification features may be measured or extracted for a combined/beam-formed signal (e.g., beam-formed signal 205 shown in FIG. 2), such as average LR factor.

In step 405, an initial noise estimate is computed for each of the input channels. As described above, in at least some embodiments an initial noise estimation may be derived (e.g., by the noise estimation unit 115 shown in FIG. 1) based on a quantile noise estimation or a minimum statistics method. In step 410 a feature-based speech/noise probability (also sometimes referred to simply as "feature-based speech probability") is calculated for each of the signal classification features measured in step 400. With reference to the example network architecture shown in FIG. 2, for each of the measured signal classification features (e.g., $F_1$, $F_2$, $F_3$, $F_4$, $F_5$, $F_6$, etc.) a feature-based speech/noise probability is calculated, denoted as $P(E_1|F_1)$, $P(E_i|F_i)$, $P(E_3|F_3)$, and so on. In at least some embodiments described herein, the feature-based speech/noise probability for a given signal classification feature is calculated using classifier $P(E_i|F_i)$, and a recursive time-average for individual feature probability may be obtained using the expression indicated next to the example single-channel arrangement shown in FIG. 3.

After the feature-based speech/noise probabilities are calculated in step 410, the process continues to step 415 where the feature-based speech/noise probabilities of each input channel are combined to generate a speech/noise probability (also sometimes referred to simply as "speech probability) for the channel. For example, referring again to the network architecture shown in FIG. 2, the feature-based speech/noise probabilities calculated in Layer 1 for channel 200A, namely $P(E_1|F_1)$, $P(E_2|F_2)$, $P(E_3|F_3)$, are combined (e.g., fused) using the state-conditioned transition probability $P(D_1|E_1,E_2,E_3)$ in Layer 2 of the network model to generate an intermediate speech/noise probability $P(D_1|F_1,F_2,F_3)$ for the channel. The intermediate speech/noise state, $D_1$, for channel 200A may be obtained from the speech/noise probability $P(D_1|F_1,F_2,F_3)$. The speech/noise states for other input channels may be obtained in a similar manner. Furthermore, in at least some embodiments described herein, the model used for $P(D_i|E_1,E_2,E_3)$ may be a weighted average over the states $E_1,E_2,E_3$ as shown in the expressions next to the example single-channel arrangement of FIG. 3. In another embodiment, a multiplicative model (e.g., the multiplicative model described above as one of the methods that may be implemented for the flow of data and information for the middle and top layers of the network architecture for the single-channel arrangement shown in FIG. 3) may be used to model the quantity $P(D_1|E_1,E_2,E_3)$.

In step 420, an overall speech/noise probability for the input frame is calculated using the speech/noise probabilities of all the input channels (e.g., input channels 200A, 200B, through 200N, and also combined/beam-formed input 205 shown in FIG. 2). For example, referring to network architecture illustrated in FIG. 2, the speech/noise probabilities generated for the input channels in Layer 2 (e.g., $P(D_1|E_1,E_2,E_3)$, $P(D_2|E_4,E_5,E_6)$ through $P(D_N|E_M,E_{M+1},E_{M+2})$ and also $P(D_{BF}|F_{BF})$ for the combined/beam-formed signal 205) are combined (e.g., fused) using the state-conditioned transition probability $P(C|D_1,D_2,D_N,D_{BF})$ to calculate an overall speech/noise probability $P(C|\{F_i\})$ for the input frame in Layer 3. In at least some embodiments of the disclosure, the overall speech/noise state C for the input frame may be calculated using probability $P(C|\{F_i\})$, as shown in the top layer of the network model in FIG. 2. This speech/noise probability represents the best estimate given the plurality of feature input data to the layered network model. A decisive class state (e.g., "0" for noise and "1" for speech) may be obtained from the probability by thresholding the probability. In the context of a noise suppression system, the actual probability value, $P(C|\{F_i\})$, of the speech/noise state is directly used. In at least some embodiments described herein, the model used for $P(C|D_1,D_2,D_N,D_{BF})$ may be a weighted average over the different channels (e.g., the weighted average presented in the above description of user control over how information or data from each channel is weighted when combined in the layered network model), where the weights are determined by the user or system configuration.

The overall speech/noise probability for the input frame calculated in step 420 is used in step 425 to classify the input frame as speech or noise. In at least some embodiments described herein, the speech/noise probability $P(C|\{F_i\})$ denotes the probabilistic classification state of the frame as either speech or noise, and depends on the best estimates combined from each of the input channels.

The final speech/noise probability function is therefore given as $$P(C|Y_1(k,t),Y_2(k,t),\{F_i\})=P(Y_1(k,t),Y_2(k,t)|C)P(C|\{F_i\})p(\{F_i\})$$

and is used in step 430 of the process to update the initial noise estimate, for each frame and frequency index of the received signal. In at least some embodiments of the disclosure, the noise estimate update is a soft-recursive update based on the following model, which is reproduced from above for convenience:

$$|N(k,t)|=\gamma_n|N(k,t-1)|+(1-\gamma_n)A$$

$$A=P(C=1|Y_1(k,t),Y_2(k,t),\{F_i\})|N(k,t-1)|+P(C=0|Y_1(k,t),Y_2(k,t),\{F_i\})|Z(k,t)|$$

Figure 5:
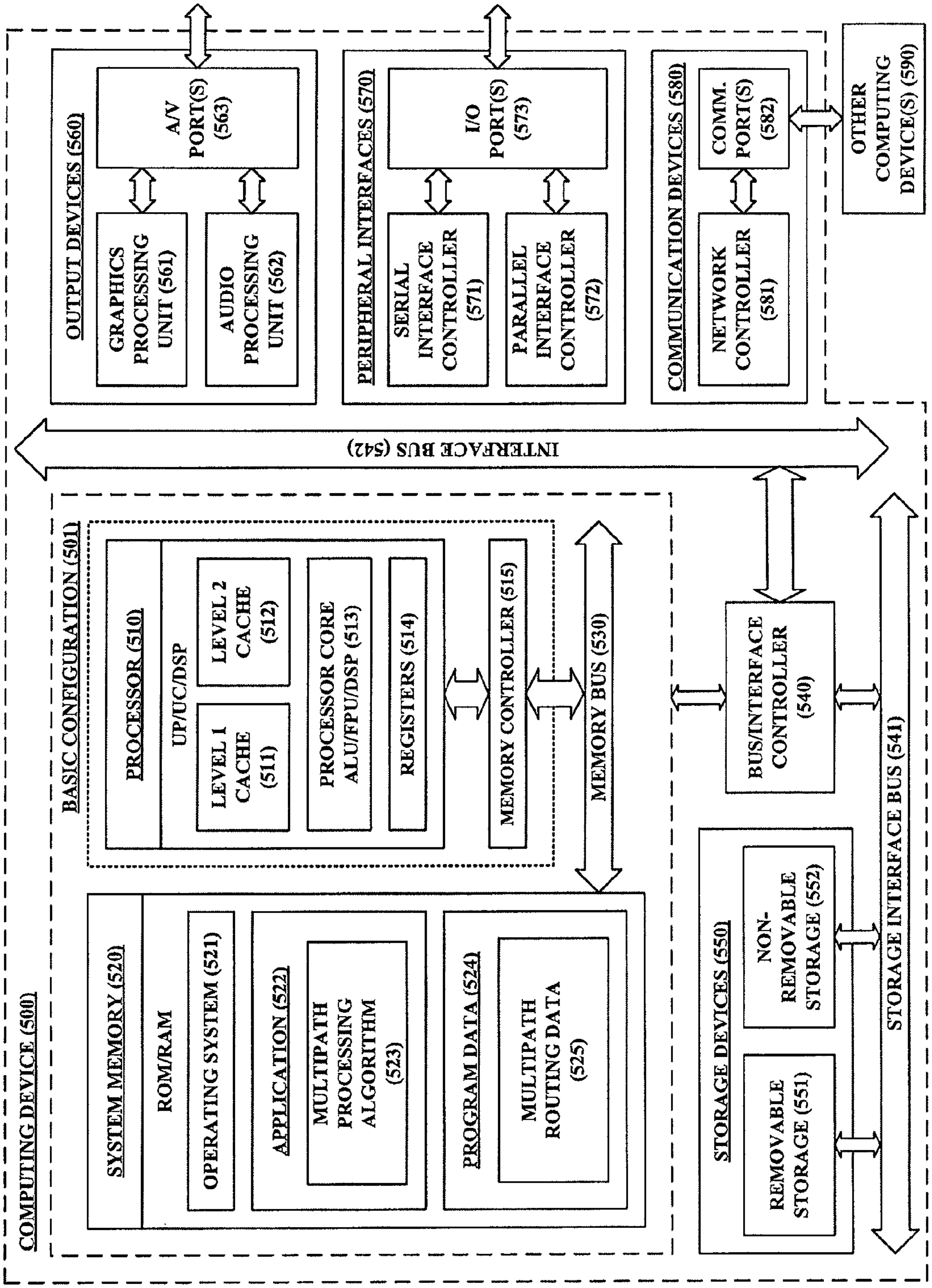
FIG. 5 is a block diagram illustrating an example computing device arranged for multipath routing and processing of input signals according to one or more embodiments described herein.

FIG. 5 is a block diagram illustrating an example computing device 500 that is arranged for multipath routing in accordance with one or more embodiments of the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 can be of any type including but not limited to a microprocessor (μP), a microcontroller (μC), a digital signal processor (DSP), or any combination thereof. Processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 can also be used with the processor 510, or in some embodiments the memory controller 515 can be an internal part of the processor 510

Depending on the desired configuration, the system memory 520 can be of any type including but not limited to volatile memory (e.g., RAM), non-volatile memory (e.g., ROM, flash memory, etc.) or any combination thereof. System memory 520 typically includes an operating system 521, one or more applications 522, and program data 524. In at least some embodiments, application 522 includes a multipath processing algorithm 523 that is configured to pass a noisy input signal from multiple input channels (e.g., input channels 200A, 200B, through 200N shown in FIG. 2) to a noise suppression component or module (e.g., noise suppression module 160 shown in FIG. 1). The multipath processing algorithm is further arranged to pass a noise-suppressed output from the noise suppression component or module to other components in the signal processing pathway. Program Data 524 may include multipath routing data 525 that is useful for passing frames of a noisy input signal along multiple signal pathways to, for example, a signal analysis unit, a noise estimation unit, a feature extraction unit, and/or a speech/noise classification unit (e.g., signal analysis unit 110, noise estimation unit 115, feature extraction unit 125, and speech/noise classification unit 140 shown in FIG. 1) where an estimation can be made as to whether each input frame is speech or noise.

Computing device 500 can have additional features and/or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of computing device 500.

Computing device 500 can also include an interface bus 542 for facilitating communication from various interface devices (e.g., output interfaces, peripheral interfaces, communication interfaces, etc.) to the basic configuration 501 via the bus/interface controller 540. Example output devices 560 include a graphics processing unit 561 and an audio processing unit 562, either or both of which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication (not shown) via one or more communication ports 582. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A computer-implemented architecture for classifying an audio signal received at a multi-channel noise suppression system as speech or noise, the architecture comprising:

a first layer for generating a feature-based speech probability for each of a plurality of signal classification features measured for a frame of the signal input from each of a plurality of input channels;

a second layer for generating, for each of the plurality of input channels, a speech probability for the input channel by combining the feature-based speech probabilities of the input channel; and a third layer for generating a combined speech probability for the frame of the signal using the speech probabilities of the plurality of input channels, wherein the layers comprise a probabilistic layered network model and an additive model or a multiplicative model is used for the third layer of the probabilistic layered network model.

2. The computer-implemented architecture of claim 1, wherein the probabilistic layered network model is a Bayesian network model.

3. The computer-implemented architecture of claim 1, wherein an additive model is used for the second layer of the probabilistic layered network model.

4. The computer-implemented architecture of claim 1, wherein a multiplicative model is used for the second layer of the probabilistic layered network model.

5. The computer-implemented architecture of claim 1, wherein the speech probability generated for each of the input channels denotes a probability of a class state of speech or noise for a layer of the probabilistic layered network model.

6. The computer-implemented architecture of claim 1, wherein the feature-based speech probability generated for each of the measured signal classification features denotes a probability of a class state of speech or noise for a layer of the probabilistic layered network model.

7. The computer-implemented architecture of claim 1, wherein the plurality of measured signal classification features from the plurality of input channels are input data to the probabilistic layered network model.

8. The computer-implemented architecture of claim 1, wherein the combined speech is an output of the probabilistic layered network model.

9. The computer-implemented architecture of claim 1, wherein one or both of the first layer and the second layer includes a set of intermediate states each denoting a class state of speech or noise.

10. The computer-implemented architecture of claim 1, wherein the feature-based speech probability is a function of the measured signal classification feature, and wherein the speech probability for each of the plurality of input channels is a function of the feature-based speech probabilities for the input channel.

11. A multi-channel noise suppression system comprising:

a plurality of input channels; and a noise suppression module configured to:

measure signal classification features for an audio signal frame input from each of the plurality of input channels;

calculate a feature-based speech probability for each of the measured signal classification features of each of the plurality of input channels;

generate a speech probability for each of the plurality of input channels by combining the feature-based speech probabilities of the input channel; and generate a combined speech probability for the audio signal frame using at least one of the speech probabilities of the plurality of input channels and an additive model for a top layer of a probabilistic layered network model.

12. The noise suppression system of claim 11, wherein the noise suppression module is further configured to update an initial noise estimate for each of the plurality of input channels using the combined speech probability.

13. The noise suppression system of claim 11, wherein the noise suppression module is further configured to:

combine the audio signal frames input from the plurality of input channels;

measure at least one signal classification feature of the combined frames;

calculate a feature-based speech probability for the combined frames using the at least one measured signal classification feature; and combine the feature-based speech probability for the combined frames with the speech probabilities generated for each of the plurality of input channels.

14. The noise suppression system of claim 13, wherein the noise suppression module is further configured to combine the audio signal frames input from the plurality of input channels using beam-forming on the audio signal frames from the channels.

15. The noise suppression system of claim 11, wherein the noise suppression module is further configured to generate the combined speech probability using a multiplicative model for the top layer of the probabilistic layered network model.

16. The noise suppression system of claim 11, wherein the noise suppression module is further configured to, for each of the plurality of input channels, combine the feature-based speech probabilities of the input channel using an additive model for a middle layer of a probabilistic layered network model.

17. The noise suppression system of claim 11, wherein each of the plurality of input channels is configured to receive either audio signals comprising noise and speech, or audio signals comprising only noise.

18. The noise suppression system of claim 17, wherein the noise suppression module is further configured to generate a combined speech probability using the speech probabilities of the input channels configured to receive audio signals comprising noise and speech.

19. The noise suppression system of claim 11, wherein the noise suppression module is further configured to:

assign one or more weighting terms to the speech probabilities of the plurality of input channels, the one or more weighting terms being assigned based on one or more conditions; and generate the combined speech probability using the speech probabilities of the plurality of input channels with the one or more weighting terms assigned.

20. A method for classifying an audio signal received at a noise suppression module via a plurality of input channels as speech or noise, the method comprising:

measuring, for each of the plurality of channels, signal classification features for a frame of the signal input from the channel;

determining, for each of the measured signal classification features of each of the plurality of channels, a first classification state for the signal based on the measured signal classification feature;

determining, for each of the plurality of channels, a second classification state for the signal by combining the first classification states of the channel using a probabilistic layered network model with an additive model as a top layer; and classifying the signal as speech or noise based on the second classification states of the plurality of channels.

* * * * *